Nov. 6, 1951 — W. ISLER — 2,574,394
APPARATUS FOR TRANSFERRING LOADS FROM PALLETS TO INDUSTRIAL TRUCKS
Original Filed Oct. 27, 1943 — 2 SHEETS—SHEET 1

INVENTOR.
WILLIAM ISLER.
BY Fay, Oberdick & Fay
Attorneys.

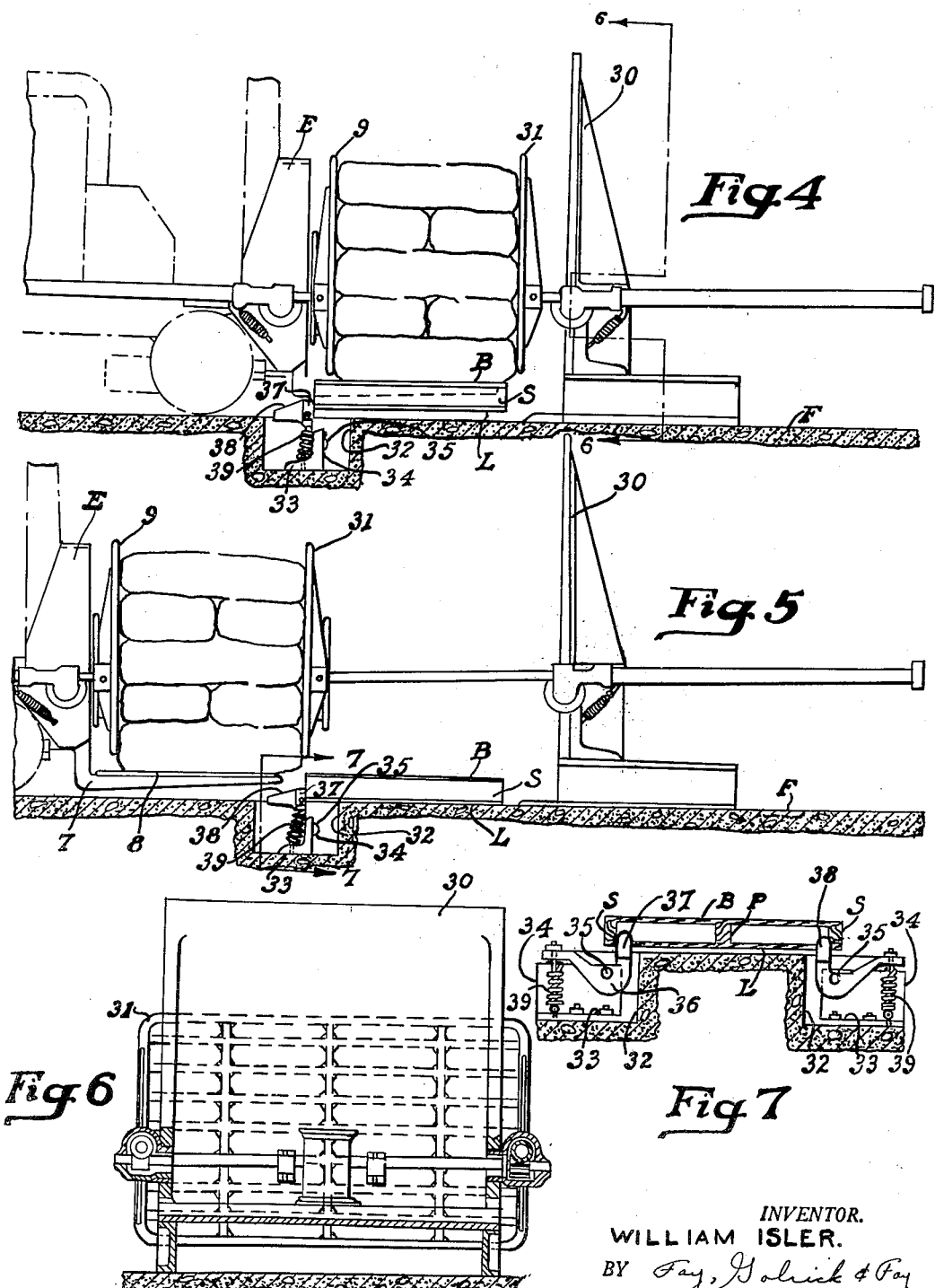

Patented Nov. 6, 1951

2,574,394

UNITED STATES PATENT OFFICE 2,574,394

APPARATUS FOR TRANSFERRING LOADS FROM PALLETS TO INDUSTRIAL TRUCKS

William Isler, Cleveland Heights, Ohio, assignor to Sheldon K. Towson, Shaker Heights, Ohio Original application October 27, 1943, Serial No. 507,792. Divided and this application December 15, 1945, Serial No. 635,323

6 Claims. (Cl. 214—44)

This invention relates, as indicated, to apparatus for transferring loads from pallets to industrial trucks and is a division of my co-pending application Serial No. 507,792, filed October 27, 1943, now Patent No. 2,394,692.

In the handling of loaded pallets or skids by means of industrial lift trucks and the like, it frequently becomes necessary, particularly in connection with loads such as piles or stacks of bags filled with bulk materials, i. e. flour, cement, etc., to transfer the loads from the pallets or skids to the elevator of the truck, in order to permit the load, minus the pallet, to be deposited on the floor of a freight car or upon a previously deposited load in the freight car.

Various methods and means have been proposed for accomplishing this, but in each case, mechanism or means for holding the pallet or skid while stripping the load therefrom was incorporated in the truck and pallets of special construction were designed for use in connection with such holding or retaining mechanism. These expedients were not always satisfactory, since the incorporation of such retaining means in the truck required space therefore where space was at a premium, and the mechanism was so located as to make access thereto for repair or replacement somewhat difficult. Moreover, the pallets, since they were especially designed for use in connection with such mechanism were, in some instances, limited in their field of usefulness.

The present invention has as its primary object the provision of means for facilitating the transfer of loads of the character described from pallets to industrial trucks, which do not require the use of pallet retaining or holding mechanism on the truck itself, or pallets of special construction.

Other objects and advantages of the invention will be apparent during the course of the following description.

In the accompanying drawings, forming a part of this specification, and in which like numerals are employed to designate like parts throughout the same, Fig. 1 is a view, illustrating more or less diagrammatically, one method and means for accomplishing the objects of the invention;

Fig. 4 is a view similar to Fig. 1, but showing a modification of the invention;

Fig. 5 is a view similar to Fig. 1, but showing the load as stripped from the pallet;

Fig. 6 is a view, partly in section and partly in elevation, taken on the line 6—6 of Fig. 4; and Fig. 7 is a cross-sectional view, taken on the line 7—7 of Fig. 5.

Figure 1:
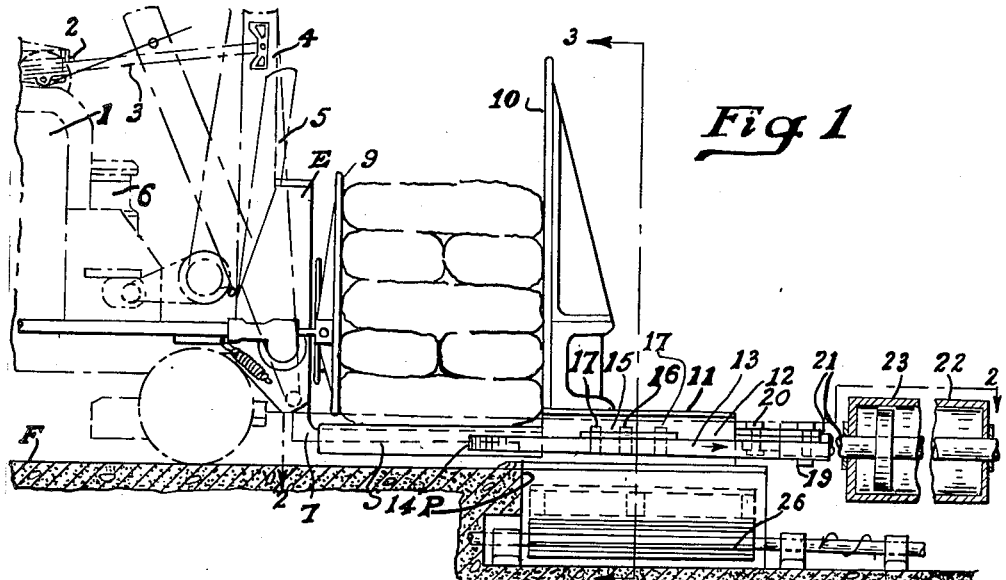
Figure 2:
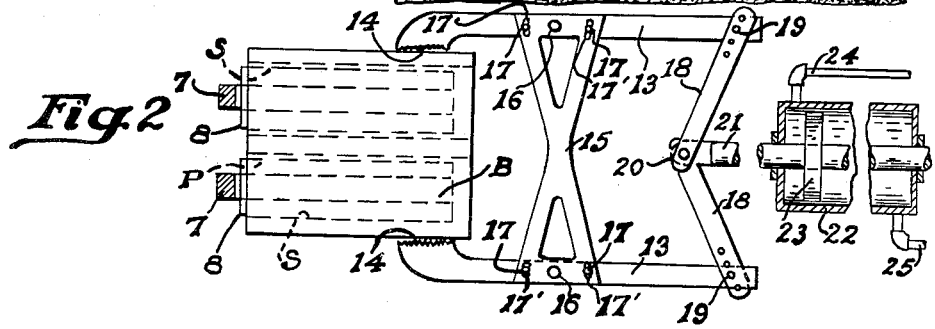
Fig. 2 is a plan view, as indicated by the line 2—2 of Fig. 1.
Figure 3:
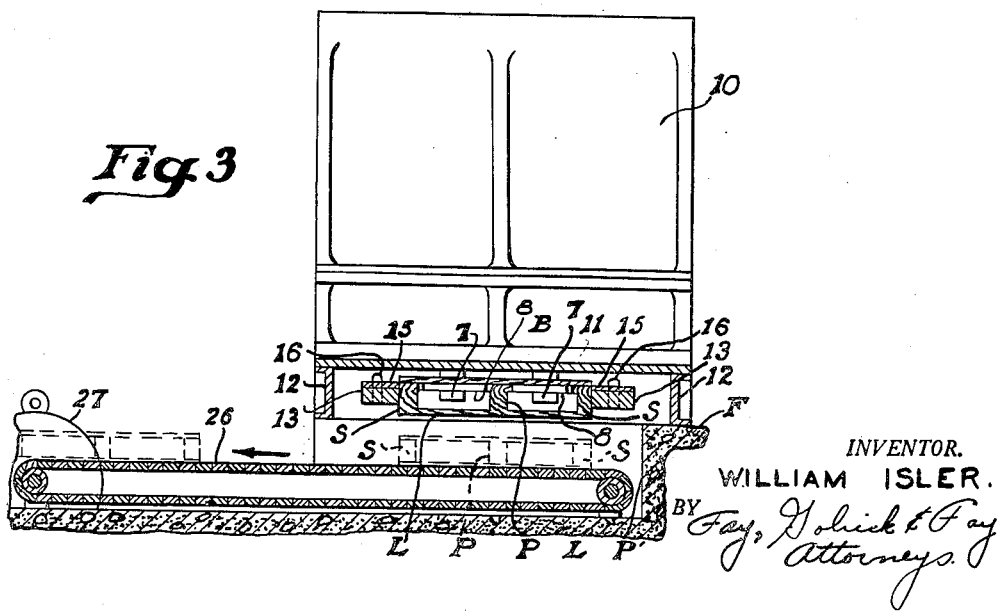
Fig. 3 is a cross-sectional view, taken on the line 3—3 of Fig. 1.

Referring to Figs. 1, 2 and 3 of the drawings, it will be seen that an industrial truck, such as is best adapted for use in conjunction with the novel features of the present invention, generally comprises a battery 1 which is used to furnish power for a motor 2, which, through racks 3, functions to tilt a frame 4 to various positions, as indicated in Fig. 1. The frame comprises spaced channels having filler strips which serve as tracks or guides for the wheels of a vertically reciprocable elevator, generally designated E.

The elevator is propelled up or down along the frame 4 by means of a cable or chain 5, the ends of which are attached in any suitable manner to the elevator E, such chains or cables being driven by a motor 6, which derives its motive power from the battery 1.

The elevator E is provided with a pair of laterally spaced forks 7 which in this instance, have plates 8 secured to the upper surfaces thereof, the combined width of these plates being substantially equivalent to the width of the ordinary load-supporting skid or pallet which trucks of this character are designed to transport.

Such skids or pallets generally consist of an upper board B, a lower board L, sides, S, and a central longitudinally extending vertically disposed partition P, all of these parts usually formed of wood or like material. For the purpose of the present invention, the upper board B will be covered with a smooth sheet of metal or other material upon which a load may be easily slid.

The truck further includes a pusher or screeen 9, which is mounted on the elevator E and is reciprocable relatively to such elevator, being substantially coextensive in width with the elevator. The construction of this pusher and the mechanism for reciprocating the same relatively to the elevator are fully described in the U. S. Patent to Henry F. Wilms, No. 2,371,661, and need not therefore be here described.

The truck is designed primarily for the lifting and transporting of loaded pallets, as shown in Fig. 1. Should the operator, after he has transported the load to the desired position, wish to leave the skid with the load, he will merely deposit the skid on the floor or on a previously deposited load, and back the truck away, the friction of the skid relatively to the floor or to the top of the previously deposited load serving to permit this without necessitating the use of the pusher 9.

Should the operator, however, wish to transport the load into a freight car, it is desirable that the load be deposited without the pallet. For the purpose of facilitating the transfer of a load, such as a pile of bags (Fig. 1), under such conditions, means have been provided for first transferring the load from the skid or pallet to the forks of the elevator. Such means comprises a stationary abutment 10, which is of somewhat greater width than the pusher 9, and is mounted on a hollow frame or enclosure consisting of a top 11 and sides 12, such enclosure being anchored to the floor F (which may be the floor of the warehouse) in any suitable manner.

Extending through the enclosure 11—12 in laterally-spaced relation is a pair of gripper bars or clamps 13 having serrated gripping or clamping faces 14. These bars are maintained (in laterally-spaced relation) by means of a rigid cross member 15, the ends of which are pivoted, as at 16, to the bars, and are maintained against relative longitudinal movement with respect to each other by means of pins 17, which extend upward from the bars 13 and into arcuate slots 17' in the ends of the member 15.

The gripping faces 14 of the bars 13 are adapted to be brought into engagement with the sides S of a skid by pivotal movement of the bars 13 about the pins 16, this being effected by a pair of toggle links 18, the outer ends of which are secured to the ends of the bars 13, as by pins 19, and the inner ends of which are secured to each other as by a pin 20. Secured to the pin 20 is a plunger 21 which extends into a cylinder 22, and is provided, within the cylinder, with a piston head 23. By admitting air or oil into one end of the cylinder 22 as through a conduit 24, the plunger 21 is moved to the right (Fig. 2), thereby bringing the faces 14 into gripping engagement with the sides of the skid. By admitting air or oil into the opposite end of the cylinder 22, as through a conduit 25, the plunger 21 is moved to the left, thereby causing the gripping faces 14 to be released from the sides of the skid.

Mechanism has also been provided for removing the empty pallets from the enclosure 11—12. For this purpose, the enclosure is disposed directly above one end of a pit or recess P' in the floor, this pit extending at right angles to the enclosure, and having disposed therein an endless conveyor 26, driven by a motor 27.

The use of the aforesaid mechanism and means will now be described.

With the pusher 9 in its retracted position, as shown in Fig. 1, the operator will pick up the skid or pallet bearing the load, and move the truck so as to bring the load into engagement with the abutment 10. Thereafter the plunger 21 will be actuated so as to bring the faces 14 of the clamping bars 13 into engagement with the sides S of the pallet. Continued movement of the plunger 21, will then cause the pallet to be pulled within the enclosure 11—12, thereby, in effect, stripping the pallet from the forks 7 and from the load, and permitting the load to drop by gravity onto the plates 8 of the forks.

Upon movement of the plunger 21 to the left, the empty pallet will be released by the jaws 14 and will fall onto the conveyor 26, and be carried by such conveyor in the direction indicated by the arrows in Fig. 3, and to a position in which it may be picked up and removed to a stack of empty pallets.

The operator can then move the load into a freight car, and, by means of the pusher 9, strip the load from the plates 8, and deposit the load on the floor of the car or on a previously deposited load.

In that form of the invention shown in Figs. 4, 5, 6 and 7, a stanchion 30, similar to the abutment 10, is provided, and has mounted thereon a pusher 31, which is similar in construction, and is adapted to be actuated in precisely the same manner as the pusher 9 on the truck, that is to say, the pusher 31 may be reciprocated relatively to the stanchion 30, which is anchored to the floor F of the warehouse.

The floor F has laterally-spaced recesses 32 therein, disposed in advance of the stanchion 30, and rigidly secured to the floor of each of the recesses 32 is a plate 33 having an upright flange 34. Pivotally secured to each of the flanges 34, as at 35, is a member 36 having stops 37 which are sloped as at 38 in the direction of movement of the truck. These stops are normally maintained above the level of the floor F by means of coil springs 39 which are secured to the other ends of members 36 and to the plates 33.

In operation, the truck carrying the loaded pallet is moved toward the stanchion 30, so as to bring the load into engagement with the pusher 31. The pallet during this movement engages the stops 37 depressing the latter against the tension of the springs 39, thereby permitting the pallet to pass over the steps. When the pallet reaches the position shown in Fig. 4, the pallet has cleared the stops 37, and the springs 39 cause the stops to be elevated to the position shown.

Thereafter, the truck is backed away from the stanchion 30, as shown in Fig. 5, and at the same time, the pusher 31 is moved at the same speed as the truck to the position shown in Fig. 5. Since the pallet is retained by the stops 37 from moving from the position shown in Fig. 4, the result will be to strip the load from the pallet as shown in Fig. 5, causing it to be transferred to the plates 8 of the forks 7.

The load may then be moved into a freight car and, by means of the pusher 9, stripped from the plates 8 and deposited upon the floor of the freight car or on a previously deposited load.

It is to be understood that the forms of my invention, herewith shown and described, are to be taken as preferred examples of the same, and that various changes in the shape, size and arrangement of parts may be resorted to, without departing from the spirit of my invention, or the scope of the subjoined claims.

Having thus described my invention, I claim:

1. In combination, a pallet for supporting a load, said pallet being adapted to receive a load-carrying element of a truck beneath the load supporting surface thereof; an abutment member adapted to engage one side of the load; and means for engaging said pallet and moving the pallet from the load-carrying element and in the direction toward said abutment whereby said pallet is stripped from beneath the load and the load is deposited on said load-carrying element.

2. In combination, a pallet for supporting a load, said pallet being adapted to receive a load-carrying element of a truck beneath the load supporting surface thereof; a stationary abutment for engaging said pallet for preventing movement of the pallet in one direction when the truck and load-carrying element is moved in said direction; and a movable abutment for engaging one side of said load for sliding said load in said one direction whereby the load may be slidingly transferred to the load-carrying element of said truck by moving the truck in the same direction and at the same rate as the movable abutment.

3. In combination, a pallet for supporting a load, said pallet being adapted to receive a load-carrying element of a truck beneath the load supporting surface thereof; an abutment member adapted to engage one side of the load; and means for engaging said pallet and moving the pallet from the load-carrying element and in the direction toward said abutment whereby said pallet is stripped from beneath the load and the load is deposited on said load-carrying element, said means including a pair of arms extendable along opposite sides of the pallet and being movable toward one another for engagement with the pallet.

4. In combination, a pallet for supporting a load, said pallet being adapted to receive a load-carrying element of a truck beneath the load supporting surface thereof; an abutment member comprising a base and a vertical wall extending from the base, said base having an opening for receiving said pallet therethrough; and movable means extending through said opening and being adapted to engage and withdraw said pallet through the opening whereby the load may be stripped from the pallet and onto said load-carrying element.

5. In combination, a pallet for supporting a load, said pallet being adapted to receive a load-carrying element of a truck beneath the load supporting surface thereof; an abutment spaced from the floor for engaging a side of the load on the pallet without engaging the pallet; means for reciprocating said abutment in a pallet stripping stroke; and means forming a stop for engaging an edge of the pallet for preventing movement of the pallet in the direction of said stroke, said stop means being disposed to be spaced from said abutment when the abutment is at one end of its stroke for admitting the pallet between the vertical plane of the abutment and the stop means.

6. In combination, a pallet for supporting a load, said pallet being adapted to receive a load carrying element of a truck beneath the load supporting surface thereof; means forming an abutment adapted to engage a side of said load; means for positively engaging said pallet while said pallet is carried by said load carrying element for effecting relative movement between the pallet and load engaging abutment means, one of said means being movable in line relative to the other whereby the pallet may be slidingly removed from between the load and the load carrying element and the load deposited directly on said load carrying element.

WILLIAM ISLER.

REFERENCES CITED

The following references are of record in the file of this patent:

UNITED STATES PATENTS

| Number | Name | Date |
| --- | --- | --- |
| 1,149,309 | Von Phul et al. | Aug. 10, 1915 |
| 1,526,993 | Luce | Feb. 17, 1925 |
| 2,256,454 | Bomar | Sept. 16, 1941 |
| 2,394,692 | Isler | Feb. 12, 1946 |
| 2,394,693 | Golrick | Feb. 12, 1946 |